Feb. 24, 1970     C. L. HARMS ET AL     3,497,240
LOAD TRANSFERRING TRAILER HITCH
Filed Feb. 13, 1968     3 Sheets-Sheet 1
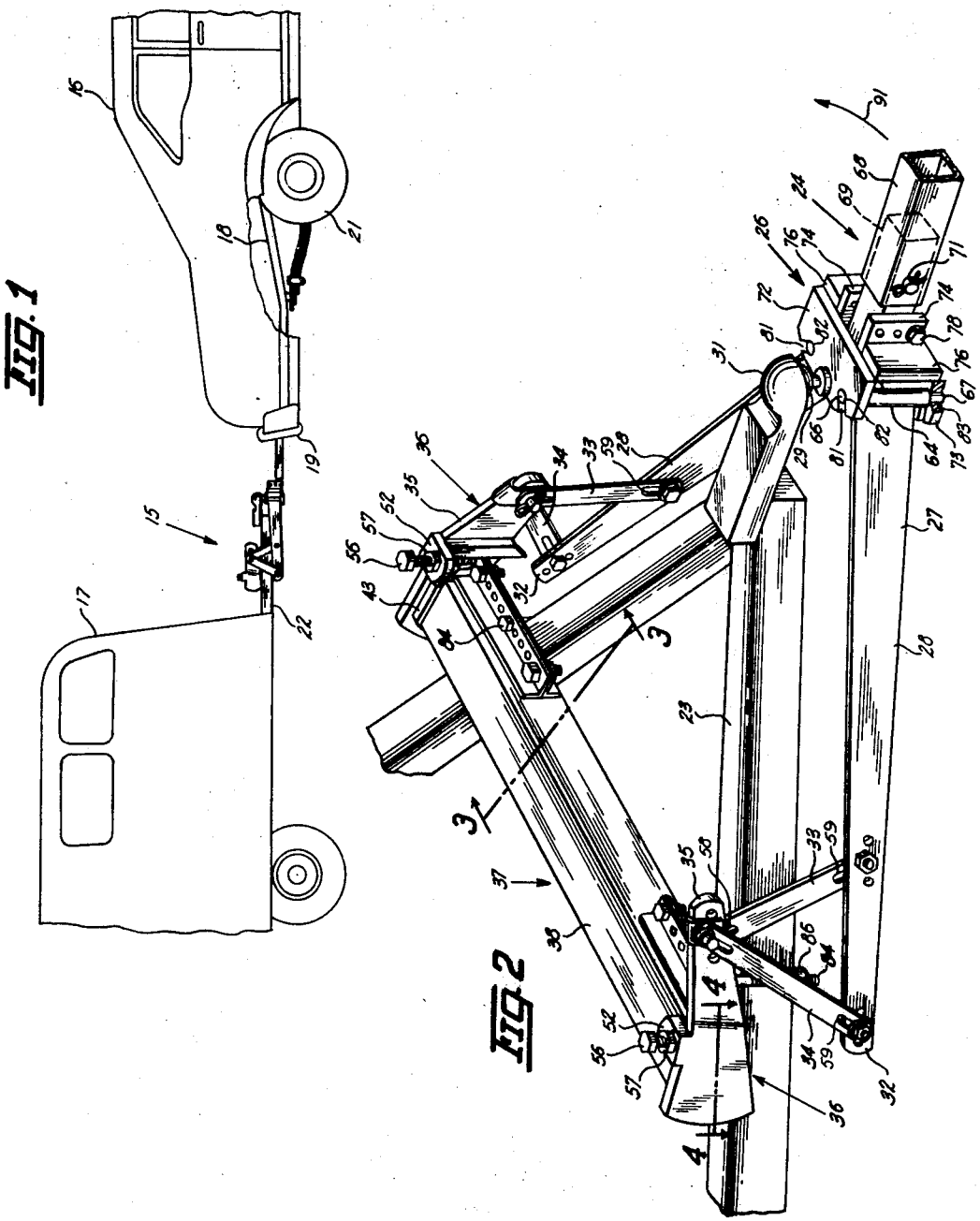
INVENTORS.
CLARENCE L. HARMS
RICHARD E. DOERFER
BY *Rudolph L. Lowell*
ATTORNEY.

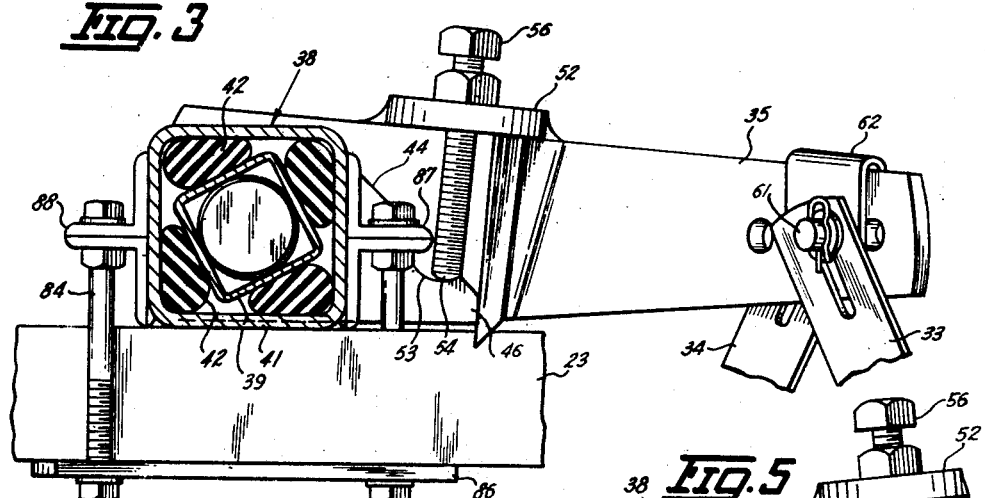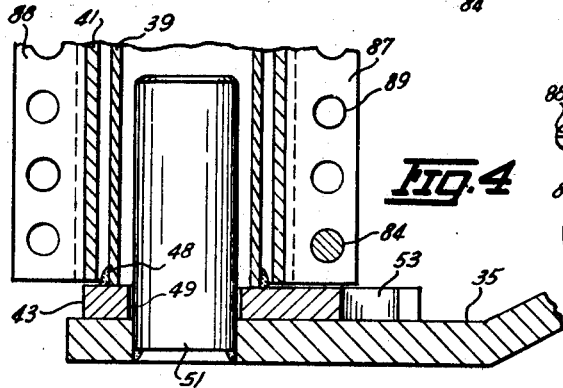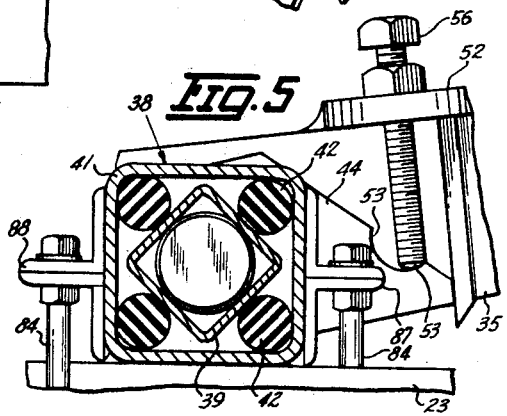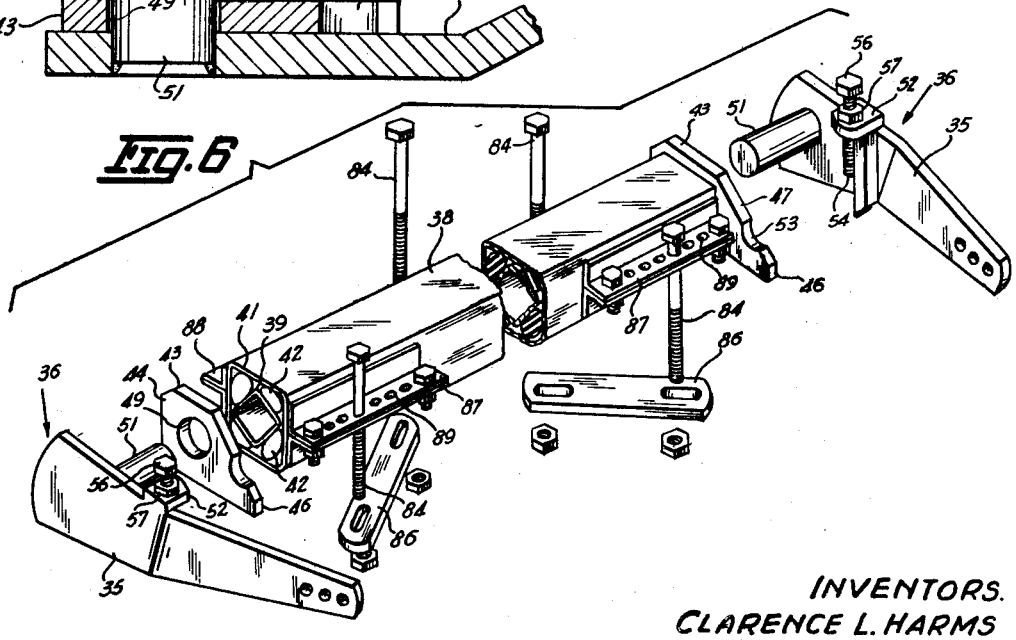

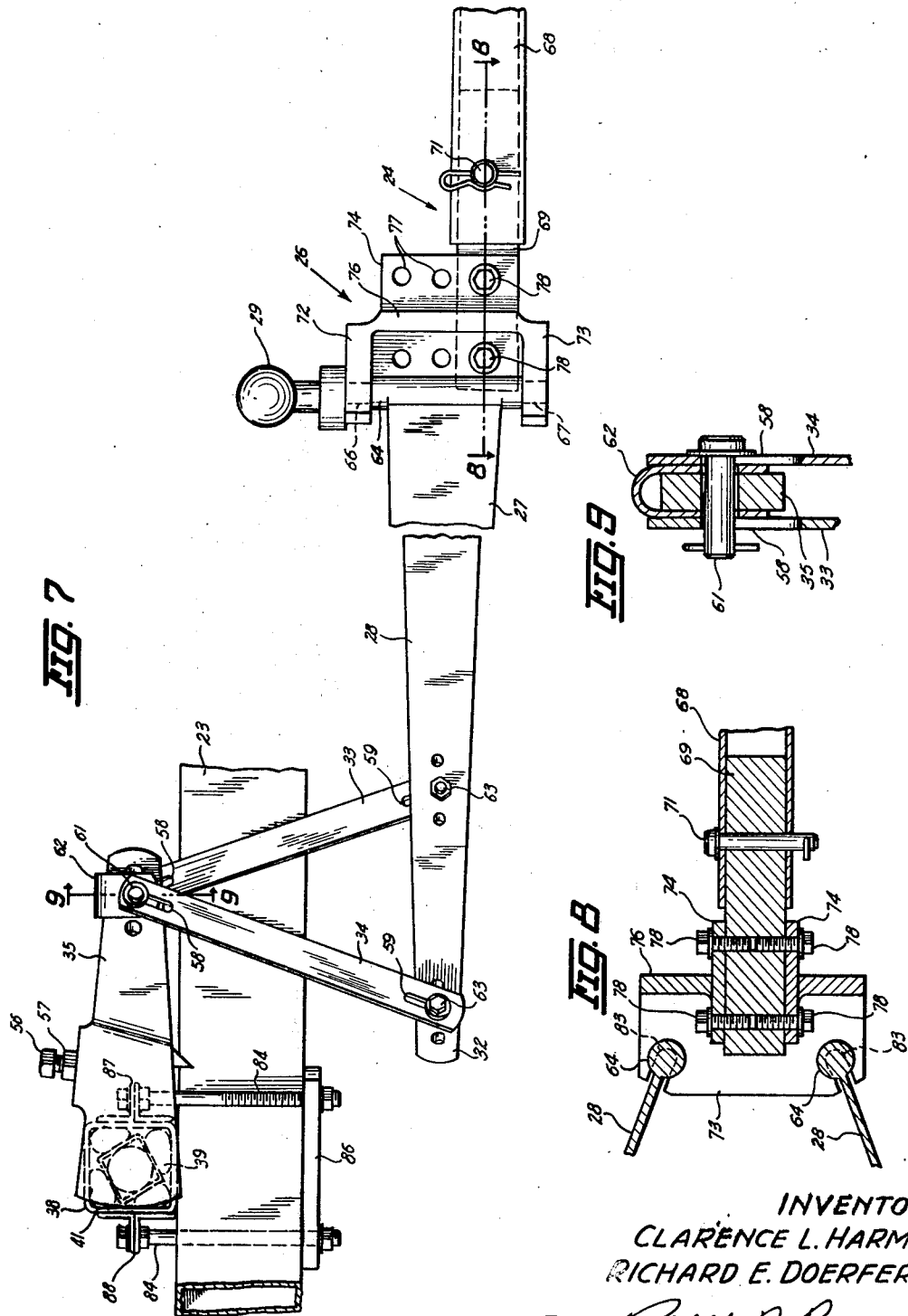

United States Patent Office 3,497,240
Patented Feb. 24, 1970

3,497,240
LOAD TRANSFERRING TRAILER HITCH
Clarence L. Harms, Cedar Falls, and Richard E. Doerfer, Waterloo, Iowa, assignors to Ideal Mfg. Co., Oskaloosa, Iowa, a corporation of Iowa
Filed Feb. 13, 1968, Ser. No. 705,160
Int. Cl. B60d 1/06, 1/00
U.S. Cl. 280—406          6 Claims

ABSTRACT OF THE DISCLOSURE

A trailer stabilizing hitch includes a head assembly that is secured to a draw bar projected rearwardly from and rigidly carried on the tractor frame. The head assembly includes a hitch ball that is connectible with a hitch socket carried on the trailer frame. A torque arm structure includes a torque unit extended transversely of and mounted on the trailer frame and having an arm assembly at each end of the torque unit. A torsional force applied on the arm assemblies acts to bias the arm assemblies in upward and rearward directions. A pair of swing bars have their front ends pivoted about vertical axes arranged on the head assembly to opposite sides of the hitch ball, and from such pivots extend rearwardly in a diverged relation so that the rear ends thereof are located below corresponding ones of the arm assemblies. Each ar massembly and swing bar are interconnected by a pair of upright lift links having their upper ends in a lost motion connection with the forward end of an arm assembly, and the lower ends thereof connected by lost motion connections with a swing bar at positions spaced longitudinally of the rear end of a swing bar. The lift force acting on the arm assemblies may be varied, and is applied through the links to the swing bars to counteract the trailer load that is applied on the rear end of the tractor vehicle by the trailer vehicle and to distribute such load between the trailer wheels and the front wheels of the tractor.

SUMMARY OF THE INVENTION

The load transferring trailer hitch of this invention is of a simple construction, readily assembled for use, capable of handling variable trailer loads and efficient in operation to transfer such loads between the trailer and tractor vehicles to maintain the frames of the trailer and tractor vehicles substantially level during road travel. The lost motion connections and relative arrangement of the pairs of lift links with the arm assemblies and swing bars provides for one or both links in a pair of links being in lifting engagement with associated swing bars whereby to substantially eliminate sway of the trailer vehicle during a normal forward travel of the vehicle, and to maintain the trailer frame level during turning movement of the trailer vehicle. The torque arm structure is adjustable longitudinally of the trailer frame, and the lift links are adjustable relative to the arm assemblies and swing bars to accommodate variable trailer loads. Concurrently with such adjustments the lift force applied on the arm assemblies may be varied.

DETAILED DESCRIPTION OF THE INVENTION

Further objects, features and advantages of the invention will become apparent from the following description when taken in connection with the accompanying drawings wherein:

FIG. 1 is a side elevational view of an automobile and a house trailer being towed thereby showing the load stabilizing hitch of this invention in assembly relation therewith;

FIG. 2 is a top perspective view of the load stabilizing hitch of this invention;

FIGS. 3 and 4 are enlarged sectional detail views taken along the line 3—3 and 4—4, respectively, of FIG. 2 showing a torque unit and arm assembly which form part of the load stabilizing hitch;

FIG. 5 is a sectional view illustrated similarly to FIG. 3 showing the torque unit in a changed position;

FIG. 6 is an exploded perspective view of the torque unit and arm assemblies;

FIG. 7 is a foreshortened side elevational view of the stabilizing hitch; and

FIGS. 8 and 9 are enlarged sectional detail views taken on the lines 8—8 and 9—9, respectively, in FIG. 7.

Referring to the drawings, the stabilizing hitch of this invention, indicated generally at 15, is shown in FIG. 1 in assembly relation with a tractor vehicle, such as an automobile 16, and a trailer vehicle 17, illustrated as a house trailer. The car 16 has the usual frame 18, a bumper 19 at the rear end of the frame, rear wheels 21 and front wheels (not shown). The trailer 17 is shown as of two wheel type having a frame 22, the forward end of which terminates in a V-shape tongue structure 23 as appears best in FIG. 2.

The load transfer or stabilizing hitch 15 (FIG. 2) includes a draw bar unit 24 for supporting a head assembly 26 on which are pivotally mounted the forward ends 27 of a pair of rearwardly diverged swing bars 28 that are located to opposite sides of the tongue structure 23. Mounted on the head assembly 26 is a hitch ball 29 that is connectible with a hitch socket 31 carried at the front or apex end of the tongue structure 23.

The rear end 32 of each swing bar 28 is connected by a pair of lift links 33 and 34 to the free or forward end of a lift arm 35 that forms part of an arm assembly 36 for a torque unit 37. The combination of the arm assemblies 36 and torque unit 37 will hereinafter be referred to as a torque arm structure 38. The torque unit 37 is arranged transversely of the trailer frame 22, and has a lift arm 35 located at each end thereof. The torsional force effected by the torque arm structure 38 acts to rotate the lift arms 35 in upward and rearward directions.

The torque unit 37 (FIGS. 3 and 5) is comprised of inner and outer tubular members 39 and 41, respectively, that are of a generally square shape in cross section and with the inner tube 39 receivable in a spaced relation within the outer tube 41. Located between each pair of corresponding sides of the tube members 39 and 41 are cushioning elements 42 that are of a generally circular shape in transverse section and of a length coextensive with the length of the tubular members 39 and 41. In a no-load condition for the torque unit 37, as shown in FIG. 5, each side face of the inner tubular member 39 is opposite the apex or junction between two adjacent sides of the outer tubular member 41 so as to define a longitudinally extended pocket 40 for a cushioning element 42. These cushioning elements 42 may be made of vulcanized natural or synthetic rubber or any other elastic material having similar properties.

With the outer tubular member 41 rigidly held against rotation, rotation of the inner tubular member 39 relative thereto to a rotated position, shown in FIG. 3, is resisted by the cushioning elements 42 so as to subject the cushioning elements 42 to compression between the adjacent side surfaces of the tubular members 39 and 41. The torque unit 37 is reversible in that it will provide the same resistance to torque applied in either direction about the axis of relative rotation of the inner and outer tubular members 39 and 41. In the present invention torque is applied to the inner tubular member 39 by torque arms 43, which form part of the arm assemblies 36, so that the torsional force effected by the torque unit 37 acts to rotate the lift arms 35 in upward and rearward directions. For a more detailed description of the torque unit 37 reference is made to U.S. Patent No. 2,712,742.

Since each arm assembly 36 is of a similar construction and assembled in a like manner with the torque unit 37 only one of such assemblies 36 will be described in detail. As best appears in FIGS. 3 and 6 a lift arm 35 is of a greater length than a torque arm 43. The torque arm is of a generally triangular shape having a rear base section 44 and a forwardly extended apex section 46, the upper side 47 of which is inclined downwardly and forwardly. The base section 44 has one side surface thereof rigidly secured by a weldment 48 (FIG. 4) to the adjacent end of the inner tubular member 39 and is formed with a circular opening 49 (FIG. 6) coaxial with the inner tubular member 39. On rotational movement of the torque arm 43, therefore, torque is applied to the inner tubular member 39.

Provided at the rear end of the lift arm 35 and extended laterally inwardly therefrom is a stub shaft 51 (FIGS. 4 and 6) which is projected through the opening 49 in the torque arm 43 for reception into the adjacent end of the inner tubular member 39. The shaft 51 extends within the inner tubular member 39 to a position wherein the lift arm 35 is in a side by side relation with the torque arm 43 and is of a size to provide for the bearing engagement of its peripheral surface with opposite side surfaces of the inner tubular member 39 as shown in FIG. 3.

Located forwardly of the stub shaft 51 and extended laterally inwardly from the lift arm 35 is a bearing block 52 that overlies a recessed seat 53 formed in the upper side 47 of the apex section 46 of the torque arm 43. Threadable within the bearing block 52 for bearing engagement of its lower end 54 within the seat 53 is an adjusting screw 56 provided with a lock nut 57.

When a load is applied downwardly on the forward end of the lift arm 35 such load acts through the screw 56 downwardly against the torque arm 43 to apply a torque to the inner tubular member 39. This torque is resisted by the cushioning elements 42 so that the applied load on the lift arm 35 is resisted by the torque unit 37 which effects a counter acting upwardly directed force on the lift arm 35 for a purpose to appear later.

The downwardly directed trailer load is applied to the lift arms 35 by the swing bars 28 through the lift links 33 and 34 (FIG. 7). Since each pair of lift links 33 and 34 are of a similar construction and similarly assembled with a corresponding lift arm 35 and swing bar 28 only one of such assemblies will be described in detail. The lift links 33 and 34 are formed adjacent the ends thereof with longitudinally extended upper and lower slots 58 and 59, respectively. The upper ends of the links 33 and 34 are arranged in a straddling relation with the forward end of a lift arm 35, and are pivotally connected in a lost motion connection therewith by a connecting pin 61 which is extended transversely through the lift arm and through the upper slots 58. An inverted U-shape washer 62 (FIG. 9) has the legs thereof positioned between the lift arm 35 and the lift links 33 and 34 to hold the links in a spaced relation to opposite sides of the lift arm 35.

The lower ends of the links 33 and 34 are connected to the rear end of a swing bar 28 at longitudinally spaced positions thereon so as to be in a diverged relation in a direction downwardly from the connecting pin 61. In other words the lift links 33 and 34 and that portion of the swing bar 28 located between the lower ends of the links form a triangle. The lower ends of the links 33 and 34 are connected by lost motion connections with the swing bar 28 by pivot pins 63 extended transversely of the swing bar 28 and through the lower slots 59. As shown in FIG. 7 the lower ends of the links 33 and 34 are positioned to opposite sides of the swing bar 28.

Each swing bar 28 is arranged in an upright plane and is uniformly tapered over the length thereof so as to be of a reduced width at its rear end 32. Rigidly secured to the front end of a swing bar 28 is a vertically disposed pivot pin 64 having reduced upper and lower end portions 66 and 67, respectively, projected in opposite directions from the swing bar. The pivot pin 64 of the swing bars 28 are adapted for pivotal connection with the head assembly 26 at laterally spaced positions relative to the hitch ball 29 to provide for the pivotal movement of the swing bars 28 about vertically disposed parallel axes.

The head assembly 26 is rigidly secured to the draw bar unit 24 (FIGS. 7 and 8) which in turn is secured to and extends rearwardly from the car or tractor frame 18. This draw bar unit 24 has a tubular mounting member 68 fixed to the car frame for removably receiving in a telescopic relation a draw bar 69 that is slidable within the rear end of the mounting member 68. The draw bar is secured to the mounting member 68 against relative longitudinal movement by a connecting pin 71 projected through transversely aligned openings formed in the mounting member 68 and the draw bar 69. On insertion or removal of the pin 71 the trailer 17 is easily and readily connected to or disconnected from the tractor vehicle 16.

The head assembly 26 and the draw bar unit 24 are relatively constructed to provide for the vertical adjustment of the head assembly relative to the draw bar to a desired adjusted position. The head assembly 26 (FIGS. 2 and 7) includes a pair of transversely extended vertically spaced upper and lower horizontal plate members 72 and 73, respectively. The plate members are connected together in vertically spaced relation by a pair of transversely spaced longitudinally extended upright guide members 74 that are located centrally of the plate members 72 and 73 and project forwardly therefrom. Arranged to the outer side of each guide member 74 and between the forward edges of the plate members is an upright brace plate 76. The guide members 74 and brace plates 76 are secured, as by weldments, to the plate members 72 and 73 form a unitary rigid structure.

The guide members 74 are spaced a distance apart to guidably receive the draw bar 69 therebetween and are formed with vertically spaced transversely aligned pairs of openings 77 to each side of the brace plates 76. The vertical spacing of the horizontal plates 72 and 73 of the head assembly 26 is greater than the vertical height or dimension of the draw bar 69 to provide for the vertical adjustment of the head assembly 26 relative to the draw bar between the guide members 74. A vertically adjusted position of the head assembly 26 is rigidly maintained by bolt assemblies 78 projected transversely through the draw bar 69 and selected pairs of the transversely aligned openings 77 in the guide plates 74.

The upper plate 72 of the head assembly 26 is formed with a pair of slots 81 (FIG. 2) arranged in a rearwardly diverged relation from the hitch ball 29. The slots 81 are open to the rear side of the upper plate 72 and having bearing sockets 82 at their inner ends in lateral alignment with the hitch ball 29. The lower plate 73 is formed with a pair of openings 83 corresponding to and in vertical alignment with bearing sockets 82.

To pivotally connect a swing bar 28 with the head assembly 26, the swing bar is initially inclined downwardly and rearwardly therefrom to provide for the reception of a lower pivot extension 67 within an opening 83. The rear end 32 of the swing bar 28 is then moved upwardly to position an upper pivot extension within a slot 81 at the bearing socket 82.

In installation of the equalizing hitch 15 on the trailer 17 the front end of the trailer frame is initially adjustably supported by a suitable jack means (not shown) to bring the trailer frame 22 to a level position. With the car 17 on the same level ground area as the trailer and with the draw bar unit 24 thereon, the head assembly 26 is mounted on the draw bar unit at a vertically adjusted position that provides for the hitch ball 29 being receivable within the hitch socket 31 at the level position of the trailer frame 22. The car is then backed towards the trailer and the hitch ball and socket are connected.

The torque arm structure 38 is then assembled on the trailer frame 22 with the torque unit 37 secured thereto by means including clamp bolts 84 and straps 86. The outer tubular member 41 of the torque unit 37 (FIGS. 2 and 3) is provided with front and rear projected flanges 87 and 88, respectively, with each flange being formed with a series of transversely spaced openings 89 (FIG. 6). The torque unit 37 in a supported position on the tongue structure member 23 is then rigidly secured to the tongue structure in a well known manner by arranging the straps 86 to the under side of the tongue frame members (FIG. 7), inserting the clamp bolts 84 through selected openings 89 at opposite sides of the frame members and then tightening the clamp bolts 84.

The lift arms 35 are then assembled with the torque unit 37 by insertion of the stub shafts 51 within the ends of the inner tubular member 39. With the adjusting bolts 56 on the lift arms 35 retracted from the torque arm bearing seats 53 the swing bars 28 are pivotally connected with the head assembly 26, and the lift links 33 and 34 are interconnected with the lift arms 35 and the rear ends 32 of the swing bars. The trailer jack support is then removed.

Since it may be difficult to apply torque on the inner tubular member 39 by adjustment of the adjusting bolts 56 when the weight of the trailer 17 is carried on the hitch ball 29, the rear end of the car 16 may be jack supported to facilitate such adjustment. This adjustment is such that with the trailer 17 connected to the car 16, and with the car jack removed, the car and trailer are level and the lift links 33 and 34 are equally loaded. An equally loaded condition of the links is attained when the pins 61 and 63 are at the outer ends of their corresponding slots 58 and 59, respectively.

For variable trailer weights the torque unit 37 may be adjusted longitudinally of the tongue structure 23, the links 33 and 34 may be adjusted longitudinally of the lift arms 35 and swing bars 28, and the torque applied on the torque unit 37 may be varied by adjustment of the adjusting bolts 56. It is to be understood, of course, that these adjustments would be made relative to each other to provide for an equal loading of the lift links 33 and 34 when the tractor 16 and trailer 17 are in relative level positions.

By virtue of this assembly it is seen that the trailer load carried on the hitch ball 29 acts to lower the rear end of the car 16, so as to move the rear ends 32 of the swing bars 28 downwardly. This downward movement of the swing bars 28 is resisted by the action of the cushioning elements 42 of the torque unit 37, which resisting force acts to rotate the lift arms 35 upwardly and rearwardly, to in turn provide for a lifting action of the links 33 and 34 on the rear ends of the swing bars 28. Since the swing bars 28, head assembly 26 and draw bar unit 24 are held against relative up and down movement this lift action operates to transfer the load on the hitch ball rearwardly to the trailer wheels and forwardly to the tractor front wheels concurrently with relieving the load on the tractor rear wheels 21. The trailer load is thus stabilized by its transferral or distribution over the tractor-trailer combination.

During road travel the stabilizing hitch 15 operates automatically to prevent side sway of the trailer 17 relative to the car 16 and to maintain the trailer level against sidewise tilting during turning movements. Thus, assume the car and trailer are traveling in a forward direction or to the right for the stabilizing hitch 15 as shown in FIG. 2. Should the car make a left hand turn as indicated by the arrow 91 in FIG. 2, the trailer will pivot relative to the car at the hitch ball 29. Since the hitch ball 29 is rigidly mounted on the car 16 the turning pivots for the swing bars 28 will be at the pivots 64 on the head assembly 26. As a result the swing bar 28 on the inside of the turn will be moved rearwardly, and the swing bar 28 on the outside of the turn will move in a forward direction. By virtue of the lost motion connection of the links 33 and 34 with the lift arms 35 and the swing bars 28, this relative fore and aft movement of the swing bars provides for the lift force normally applied equally on all of the links 33 and 34 being applied only to the link 34 on the inside of the turn and to the link 33 on the outside of the turn. In other words, the remaining two links will carry no weight since they are moved upwardly out of any lifting connection with the lift arms 35. A reverse relative action of the links 33 and 34 will take place for a right hand turn.

Thus, during a turning movement the lift action of the arms 35 is continuously applied through the links 33 and 34 to the swing bars 28 whereby the trailer is held level throughout the turn. It is to be noted that this leveling action is complemented by the riiid securement of the torque arms 43 to the inner tubular member 39. The same leveling action, although to a more limited extent will take place during the normal steering action of the tractor vehicle in forward travel so as to eliminate trailer sway in such travel.

We claim:

1. A device for transferring a part of the load of a trailer vehicle to a tractor vehicle to which the trailing vehicle is pivotally connected, comprising:
   (a) a draw bar rigidly secured to and extended longitudinally rearwardly from the frame of the tractor vehicle,
   (b) a head assembly rigidly secured to said draw bar, having a pivot connection for the two vehicles,
   (c) a pair of elongated swing bars pivoted at the forward ends thereof on said head assembly about substantially vertical axes in a laterally spaced relation with said pivot connection,
   (d) a torque arm structure including a torque unit extended transversely of and secured to the frame of the trailer vehicle at a position adjacent the rear ends of said swing bars, and a torque arm assembly secured to each end of said torque unit and projected forwardly therefrom, and
   (e) a pair of upright link members corresponding to each torque arm assembly having the upper ends thereof in a lost motion connection with the forward end of a corresponding torque arm assembly, said links having the lower ends thereof spaced longitudinally of and in a lost motion connection with an adjacent swing bar.

2. A device according to claim 1 for transferring a part of the load of a trailer vehicle to a tractor vehicle to which the trailer vehicle is pivotally connected wherein:
   (a) the lost motion connection between a torque arm assembly and a corresponding pair of links comprises a transversely extended pin in the torque arm assembly receivable within slots extended longitudinally of and formed within the upper ends of said pair of links, and
   (b) the lost motion connection between a swing bar and a corresponding pair of links includes a pair of transversely extended pins spaced longitudinally of the swing bar and receivable within corresponding slots extended longitudinally of and formed within the lower ends of said pair of links,
   (c) said pins, during a forward travel of said vehicles, being in engagement with the outer ends of the slots corresponding thereto.

3. A device according to claim 1 for transferring a part of the load of a trailer vehicle to a tractor vehicle to which the trailer vehicle is pivotally connected wherein:
  (a) said torque unit provides a yieldable torsional force acting to rotate said torque arm assemblies in an upward and rearward direction.

4. A device according to claim 1 for transferring a part of the load of a trailer vehicle to a tractor vehicle to which the trailer vehicle is pivotally connected including:
  (a) coacting means on said head assembly and draw bar for vertically adjusting the head assembly relative to the draw bar.

5. A device according to claim 1 for transferring a part of the load of a trailer vehicle to a tractor vehicle to which the trailer vehicle is pivotally connected including:
  (a) means in said torque assemblies for varying the torsional force applied thereby to said torque unit.

6. A load-transferring trailer hitch for connecting a tractor vehicle with a trailer vehicle comprising:
  (a) a draw bar rigidly secured to and extended longitudinally rearwardly from the frame of the tractor vehicle,
  (b) a trailer head assembly secured to said draw bar having a central hitch ball,
  (c) a hitch ball socket on the frame of said trailer vehicle connectible in a pivot connection with said hitch ball,
  (d) a pair of readwardly diverging swing bars having the front ends thereof pivoted about substantially vertical axes to said head assembly in laterally spaced relation to said hitch ball,
  (e) a torque arm structure extended transversely of and secured to the frame of the trailer vehicle at a position above and rearwardly of the rear ends of said swing bars,
  (f) a pair of torque arm assemblies carried at opposite ends of said torque unit and projected forwardly therefrom over the rear ends of corresponding swing bars, and
  (g) a pair of upright links interconnected to each torque arm assembly and a corresponding swing bar, each pair of links having the upper ends thereof pivoted about a common transverse axis on a torque arm assembly and the lower ends thereof pivoted about transverse axes spaced longitudinally of the rear end of a corresponding swing bar.

References Cited

UNITED STATES PATENTS

| | | | |
|---|---|---|---|
| 2,715,034 | 8/1955 | Cornwall | 280—406.1 |
| 2,918,308 | 12/1959 | Lowman | 280—406.1 |
| 3,380,757 | 4/1968 | Sprout et al. | 280—406.1 |
| 3,403,928 | 10/1968 | Laughlin | 280—406.1 |
| 3,441,291 | 4/1969 | Morris | 280—406.1 |

LEO FRIAGLIA, Primary Examiner

M. L. SMITH, Assistant Examiner

U.S. Cl. X.R.

280—489